United States Patent
Baknina et al.

(10) Patent No.: US 11,575,453 B2
(45) Date of Patent: *Feb. 7, 2023

(54) METHOD AND APPARATUS FOR PROVIDING ENHANCED REFERENCE SIGNAL RECEIVED POWER ESTIMATION

(71) Applicant: Samsung Electronics Co., Ltd., Gyeonggi-do (KR)

(72) Inventors: Abdulrahman Baknina, San Diego, CA (US); Hyuk Joon Kwon, San Diego, CA (US)

(73) Assignee: Samsung Electronics Co. Ltd

( * ) Notice: Subject to any disclaimer, the term of this patent is extended or adjusted under 35 U.S.C. 154(b) by 91 days.

This patent is subject to a terminal disclaimer.

(21) Appl. No.: 17/197,919

(22) Filed: Mar. 10, 2021

(65) Prior Publication Data

US 2021/0266082 A1  Aug. 26, 2021

Related U.S. Application Data

(63) Continuation of application No. 16/540,783, filed on Aug. 14, 2019, now Pat. No. 10,972,201.

(60) Provisional application No. 62/842,938, filed on May 3, 2019.

(51) Int. Cl.
*H04B 17/327* (2015.01)
*H04B 17/391* (2015.01)
*H04B 17/26* (2015.01)

(52) U.S. Cl.
CPC .......... *H04B 17/327* (2015.01); *H04B 17/26* (2015.01); *H04B 17/391* (2015.01)

(58) Field of Classification Search
None
See application file for complete search history.

(56) References Cited

U.S. PATENT DOCUMENTS

| | | | |
|---|---|---|---|
| 8,724,723 B2 | 5/2014 | Panicker et al. | |
| 9,363,421 B1 | 6/2016 | Russell | |
| 9,769,687 B2 | 9/2017 | Pu et al. | |
| 9,807,718 B2 | 10/2017 | Axmon | |
| 2010/0195518 A1* | 8/2010 | McCloud | H04L 25/0242 370/252 |
| 2013/0260744 A1 | 10/2013 | Xu | |
| 2014/0064391 A1 | 3/2014 | Cheng et al. | |
| 2014/0286185 A1 | 9/2014 | Liu et al. | |
| 2018/0084486 A1 | 3/2018 | Pradas | |
| 2018/0091984 A1* | 3/2018 | Hayes | H04W 24/02 |
| 2018/0227020 A1 | 8/2018 | Ahn | |
| 2018/0294997 A1 | 10/2018 | Lee et al. | |
| 2019/0044588 A1 | 2/2019 | Hong et al. | |
| 2019/0059109 A1* | 2/2019 | Li | H04W 48/20 |
| 2019/0110220 A1 | 4/2019 | Park | |

(Continued)

*Primary Examiner* — Phirin Sam
(74) *Attorney, Agent, or Firm* — The Farrell Law Firm, P.C.

(57) ABSTRACT

A method and an apparatus for providing reference signal received power (RSRP) are disclosed herein. A signal is received in a modem. Signal elements at reference signal (RS) locations are extracted from the received signal. The signal elements at the RS locations are descrambled. Virtual reference signal (VRS) elements are formed using the descrambled signal elements. The VRS elements have smaller noise variances than original RS elements in corresponding locations of the received signal. The RSRP is estimated from the VRS elements.

20 Claims, 7 Drawing Sheets

(56) References Cited

U.S. PATENT DOCUMENTS

| | | |
|---|---|---|
| 2019/0188829 A1 | 6/2019 | Wei |
| 2020/0213901 A1* | 7/2020 | Yoshimoto |
| 2022/0191847 A1* | 6/2022 | Hong ................. H04W 72/0406 |
| 2022/0217649 A1* | 7/2022 | Lee ..................... H04W 52/242 |

* cited by examiner

METHOD AND APPARATUS FOR PROVIDING ENHANCED REFERENCE SIGNAL RECEIVED POWER ESTIMATION

PRIORITY

This application is a Continuation Application of U.S. application Ser. No. 16/540,783, filed in the U.S. Patent and Trademark Office on Aug. 14, 2019, which is based on and claims priority under 35 U.S.C. § 119(e) to a U.S. Provisional Patent Application filed on May 3, 2019 in the United States Patent and Trademark Office and assigned Ser. No. 62/842,938 the contents of which are incorporated herein by reference.

FIELD

The present disclosure relates generally to a wireless communication system, and more particularly, to a method and an apparatus for providing enhanced reference signal received power (RSRP) estimation.

BACKGROUND

Existing approaches for estimating RSRP directly utilize reference signal (RS) elements of a received signal under the assumption that channels do not vary greatly. However, such approaches result in overestimation of the RSRP, since the noise power within the RS element contributes to the RSRP estimate. Additionally, such approaches result in an overestimation of the signal to noise ratio (SNR), and also poor mobility decisions.

SUMMARY

According to one embodiment, a method of estimating RSRP is provided. A signal is received in a modem. Signal elements at RS locations are extracted from the received signal. The signal elements at the RS locations are descrambled. Virtual reference signal (VRS) elements are formed using the descrambled signal elements. The VRS elements have smaller noise variances than original RS elements in corresponding locations of the received signal. The RSRP is estimated from the VRS elements.

According to one embodiment, an electronic device is provided. The electronic device includes a processor and a non-transitory computer readable storage medium storing instructions that, when executed, cause the processor to receive a signal, extract signal elements at RS locations from the received signal, and descramble the signal elements at the RS locations. The instructions, when executed, also cause the processor to form VRS elements using the descrambled signal elements. The VRS elements have smaller noise variances than original RS elements in corresponding locations of the received signal. The RSRP is estimated from the VRS elements.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate the existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, such as, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

The present disclosure describes improving a power estimation method that is based on received reference signal (RS) elements in a modem (e.g., for $5^{th}$ generation (5G) New Radio (NR)). The resulting estimated power is also referred to as reference signal received power (RSRP). The RSRP estimate may be used in mobility decisions, such as, for example, handovers. According to an embodiment of the present disclosure, the estimation of the RSRP is improved through denoising of the received signal.

RS elements of a received signal are composed of the RS and added noise. Herein, the RSRP is estimated without the accompanying noise. Specifically, embodiments of the present disclosure describe generating, by the receiver, virtual reference signal (VRS) elements that have smaller noise variances compared to the original RS elements of the received signal, and determining the RSRP from the VRS elements.

The VRS elements are formed using the RS elements of the received signal. The term "virtual" is used to differentiate these elements from the original RS elements of the received signal. The VRS elements are used in place of the original RS elements of the received signal in estimating the RSRP.

Figure 1:
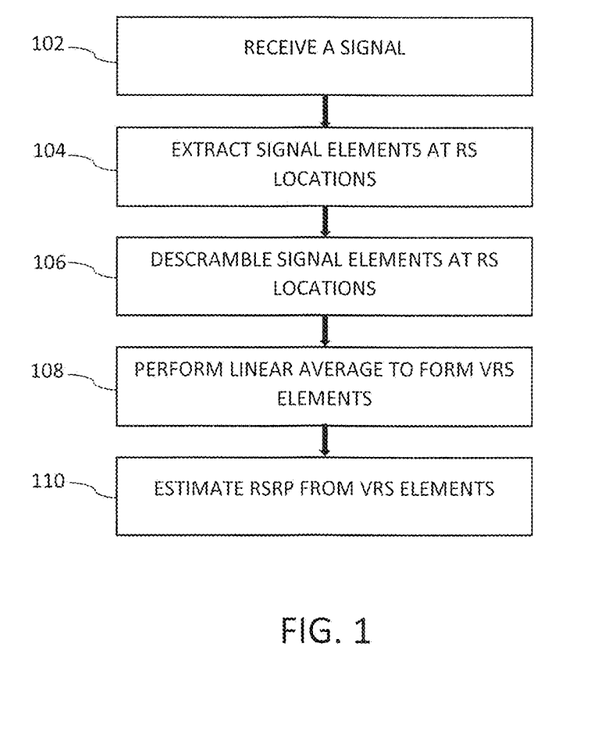
FIG. 1 is a flowchart illustrating a method for estimating RSRP, according to one embodiment.

Referring initially to FIG. 1, a flowchart illustrates a method for estimating RSRP, according to one embodiment. A modem, or receiver, receives a signal at 102. The receiver extracts signal elements at RS locations from the received signal at 104. The receiver descrambles the signal elements at the RS locations to remove a RS sequence at 106. The receiver performs a linear average of the descrambled signal elements to form VRS elements at 108. The receiver estimates the RSRP from the VRS elements at 110.

Figure 2:
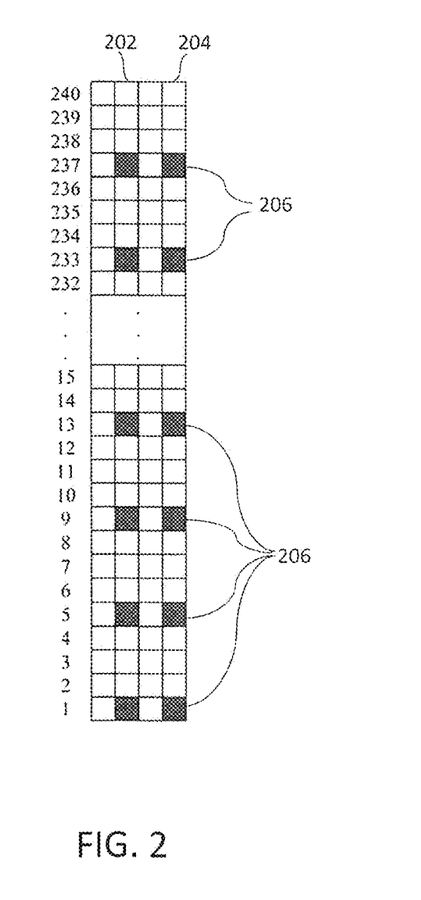
FIG. 2 is a diagram illustrating an example of RS element allocations over two symbols, according to one embodiment.

Referring now to FIG. 2, a diagram illustrates an example of RS allocations over two symbols, according to one embodiment. In each of a first symbol 202 and a second symbol 204, 60 RS elements 206 (indicated as shaded regions) are distributed uniformly across sub-carriers 1-240 (vertically) with a density of ¼ (i.e., one element every four sub-carriers).

The RS element locations in the received signal are defined as set forth below in Equation (1):

$$r_{i,j}=h_{i,j}x_{i,j}+n_{i,j}, \ i=1,5,\ldots,237, j=2,4 \quad (1)$$

where i denotes the sub-carrier index (vertical position), j denotes the symbol index (horizontal position), $n_{ij}$ denotes the noise, $h_{ij}$ denotes the channel coefficient, and xii denotes the RS sequence.

The receiver then descrambles the received signals at the RS locations to eliminate the RS sequence by multiplying it with $x_{ij}^*$ (where $x_{ij}x_{ij}^*=1$), resulting in descrambled signal elements, as set forth in Equation (2) below:

$$y_{i,j}=h_{i,j}+\tilde{n}_{i,j}, \ i=1,5,\ldots,237, j=2,4 \quad (2)$$

Using the descrambled signal elements $y_{i,j}$, the receiver forms the VRS elements by performing a linear average of descrambled signal elements.

Figure 3:
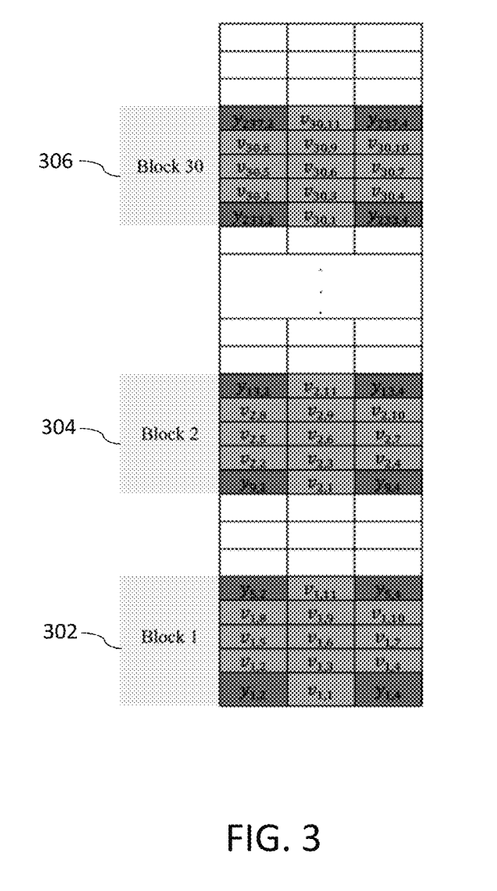
FIG. 3 is a diagram illustrating VRS elements grouped in blocks, according to one embodiment.

FIG. 3 is a diagram illustrating VRS elements grouped in blocks, according to one embodiment. Each VRS element is formed by taking a linear average of four closest descrambled signal elements of the received signal. As shown in FIG. 3, each group of elements is denoted as a block. The VRS elements of a first block 302 are ($v_{1,1}$, $v_{1,2}\ldots,v_{1,11}$) and are formed by taking a linear combination of the descrambled signal elements $\{y_{1,2}, y_{1,4}, y_{5,2}, y_{5,4}\}$. For example $v_{1,k}$, can be calculated as set forth in Equation (3) below:

$$v_{1,k} = w_k^T \begin{bmatrix} y_{1,2} \\ y_{1,4} \\ y_{5,2} \\ y_{5,4} \end{bmatrix}, \quad (3)$$

$$k \in \{1, 2, \ldots, 11\}$$

where $w_k^T \triangleq [w_{1,k}\ w_{2,k}\ w_{3,k}\ w_{4,k}]$, is the weighting vector. It is assumed that the weighting vector does not change from one block to another.

In order to ensure that VRS elements have a reduced noised variance and also maintain the power of the RS elements, constraints are imposed on the weighting vector, as set forth below in Equation (4):

$$[1111]w_k = \sum_{b=1}^{4} w_{b,k} = 1, \forall k \in \{1, 2, \ldots, 11\} \quad (4)$$

$$0 \le w_{b,k} \le 1, \forall k \in \{1, 2, \ldots, 11\}, b \in \{1, 2, 3, 4\}$$

In general, the VRS elements, $v_{m,k}$, can be calculated as set forth in Equation (5) below:

$$v_{m,k} = w_k^T \begin{bmatrix} y_{8m-3,2} \\ y_{8m-3,4} \\ y_{8m-7,2} \\ y_{8m-7,4} \end{bmatrix}, k \in \{1, 2, \ldots, 11\}, m\{1, 2, \ldots, 30\} \quad (5)$$

The VRS elements of a second block 304 are $\{v_{2,1}, v_{2,2}, \ldots, v_{2,11}\}$ and are formed by taking a linear combination of the descrambled signal elements $\{y_{9,2}, y_{9,4}, y_{13,2}, y_{13,4}\}$. The VRS elements of a thirtieth block 306 are $\{v_{30,1}, v_{30,2}, \ldots, v_{30,11}\}$ and are formed by taking a linear combination of the descrambled signal elements $\{y_{233,2}, y_{233,4}, y_{237,2}, y_{237,4}\}$.

When all of the VRS elements are calculated, a horizontal correlation and a vertical correlation may be calculated. The vertical correlation is calculated as set forth below in Equation (6):

$$g_0 = \frac{1}{149}\left(\sum_{m=1}^{30}\left(v_{m,1}v_{m,3}^* + v_{m,3}v_{m,6}^* + v_{m,6}v_{m,9}^* + v_{m,9}v_{m,11}^*\right) + \sum_{n=1}^{29}v_{n,11}v_{n+1,1}^*\right) \quad (6)$$

The horizontal correlation is calculated as set forth below in Equation (7):

$$g_1 = \frac{1}{90}\left(\sum_{m=1}^{30}v_{m,2}v_{m,4}^* + v_{m,5}v_{m,7}^* + v_{m,8}v_{m,10}^*\right) \quad (7)$$

If both the horizontal and vertical correlations are calculated, a coherent RSRP and a non-coherent RSRP may be calculated. The coherent RSRP is calculated as set forth below in Equation (8):

$$RSRP_{coh} = \frac{1}{2}|g_0 + g_1| \quad (8)$$

The non-coherent RSRP is calculated as set forth below in Equation (9):

$$RSRP_{non-coh} = \frac{1}{2}|g_0| + \frac{1}{2}|g_1| \quad (9)$$

If any of the VRS elements are not calculated (i.e., $w_k^T \triangleq [0\ 0\ 0\ 0]$), the non-calculated element is removed from the correlation and a next consecutive VRS element is used instead, as described in greater detail below.

Figure 4:
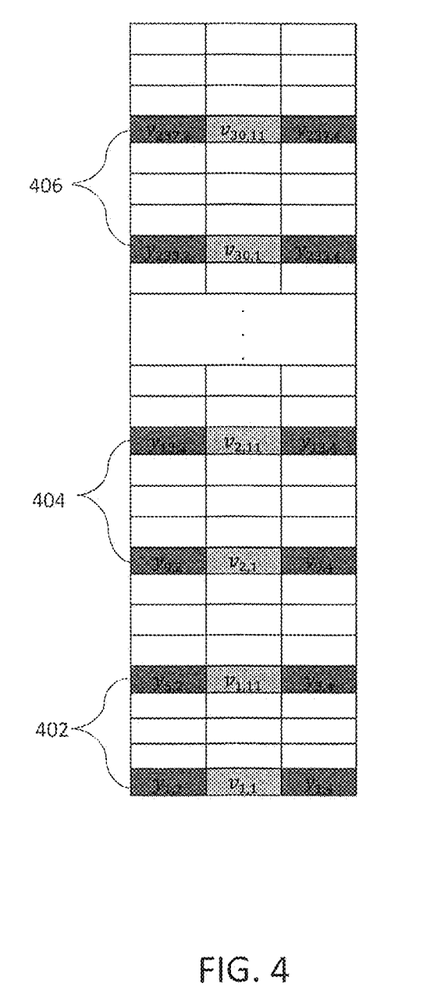
FIG. 4 is a diagram illustrating VRS elements determined from an average of two descrambled RS elements of the received signal, according to one embodiment.

FIG. 4 is a diagram illustrating VRS elements determined from an average of two descrambled signal elements of the received signal, according to one embodiment. In such an embodiment, the weight vectors are set forth as $w_k^T = [0\ 0\ 0\ 0], \forall k\{2, 3, \ldots, 9, 10\}$, $w_1^T = [\frac{1}{2}\ \frac{1}{2}\ 0\ 0]$ and $w_{11}^T = [0\ 0\ \frac{1}{2}\ \frac{1}{2}]$. The RSRP is estimated as set forth in Equation (10) below:

$$RSRP = \frac{1}{59}\left(\sum_{m=1}^{30}v_{m,1}v_{m,11}^* + \sum_{n=1}^{29}v_{n,11}v_{n+1,1}^*\right) \quad (10)$$

VRS element $v_{1,1}$ of a first block 402 is determined using $y_{1,2}$ and $y_{1,4}$. VRS element $v_{1,11}$ of the first block 402 is determined using $y_{5,2}$ and $y_{5,4}$. VRS element $v_{2,1}$ of a second block 404 is determined using $y_{9,2}$ and $y_{9,4}$. VRS element $v_{2,11}$ of the second block 404 is determined using $y_{13,2}$ and $y_{13,4}$. VRS element $v_{30,1}$ of a thirtieth block 406 is determined using $y_{233,2}$ and $y_{233,4}$. VRS element $v_{30,11}$ of the thirtieth block 406 is determined using $y_{237,2}$ and $y_{237,4}$.

The first summation in the RSRP estimation of Equation (10) represents the vertical cross-correlation between the VRS elements of the same block. The second summation in the RSRP estimation of Equation (10) represents the correlation between the last element in each block, $v_{n,11}$, and the first element in the next block, $v_{n+1,1}$. In this embodiment, it is assumed that channel invariance holds better over time, rather than over frequency.

Figure 5:
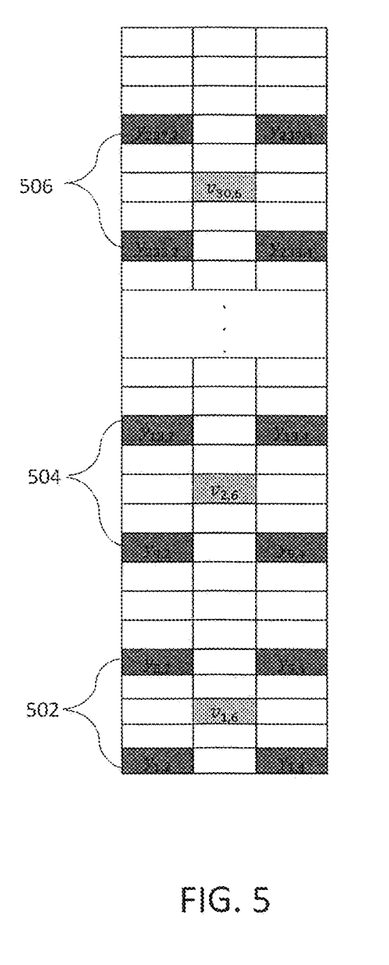
FIG. 5 is a diagram illustrating VRS elements determined from an average of four descrambled RS elements of a received signal, according to one embodiment.

FIG. 5 is a diagram illustrating VRS elements determined from an average of four descrambled RS elements of a received signal, according to one embodiment. In such an embodiment, weight vectors are set forth as $w_k^T = [0\ 0\ 0\ 0]$, $\forall k \ne 6$, $w_6^T = [\frac{1}{4}\ \frac{1}{4}\ \frac{1}{4}\ \frac{1}{4}]$. The RSRP is estimated as set forth in Equation (11) below:

$$RSRP = \frac{1}{29}\sum_{m=1}^{29}v_{m,6}v_{m+1,6}^* \quad (11)$$

VRS element $v_{1,6}$ of a first block 502 is determined using $y_{1,2}, y_{1,4}, y_{5,2},$ and $y_{5,4}$. VRS element $v_{2,6}$ of a second block 504 is determined using $y_{9,2}, y_{9,4}, y_{13,2}, y_{13,4}$. VRS element $v_{30,6}$ of a third block 506 is determined using $y_{233,2}, y_{233,4}, y_{237,2}, y_{237,4}$.

In this embodiment, the gain of denoising is maximized under practical consideration.

Figure 6:
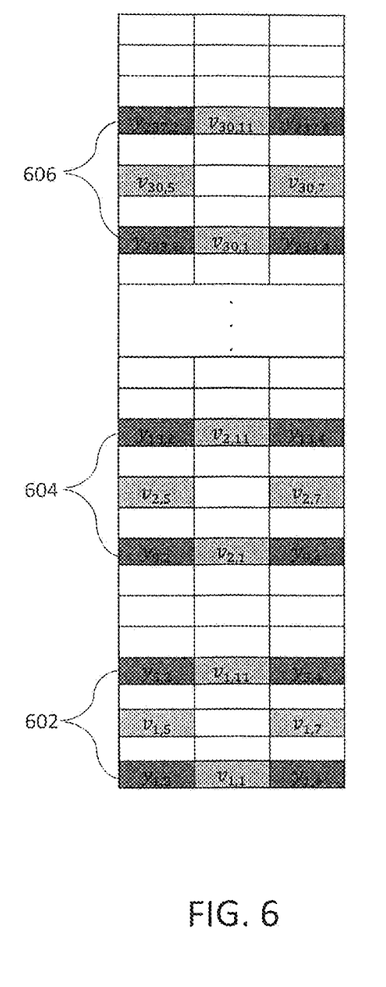
FIG. 6 is a diagram illustrating VRS elements determined based on a uniform weight vector, according to one embodiment.

FIG. 6 is a diagram illustrating VRS elements determined based on a uniform weight vector, according to one embodiment. In such an embodiment, weight vectors are set forth as $w_k^T = [0\ 0\ 0\ 0]$, $\forall k \notin \{1, 5, 7, 11\}$, $w_1^T = [\frac{1}{2}\ \frac{1}{2}\ 0\ 0]$, $w_5^T = [\frac{1}{2}\ 0\ \frac{1}{2}\ 0]$, $w_7^T = [0\ \frac{1}{2}\ 0\ \frac{1}{2}]$ and $w_{11}^T = [0\ 0\ \frac{1}{2}\ \frac{1}{2}]$. The coherent and non-coherent RSRPs are estimated using Equations (8) and (9) above, where the vertical correlation is calculated as set forth in Equation (12) below:

$$g_0 = \frac{1}{59}\left(\sum_{m=1}^{30}v_{m,1}v_{m,11}^* + \sum_{n=1}^{29}v_{n,11}v_{n,1,1}^*\right) \quad (12)$$

The horizontal correlation is calculated as set forth in Equation 13 below:

$$g_1 = \frac{1}{30}\sum_{m=1}^{30}v_{m,5}v_{m,7}^* \quad (13)$$

The weight vectors used to generate the VRS elements may be dynamically allocated to adapt to different SNRs or different system parameter values. For example, for a fast fading channel over time, the VRS elements may be determined only from descrambled signal elements in the same symbols and only vertical correlations may be considered.

VRS elements of a first block 602 are $\{v_{1,1}, v_{1,2}, v_{1,7}, v_{1,11}\}$ and are formed by taking a linear combination of the descrambled signal elements $\{y_{1,2}, y_{1,4}, y_{5,2}, y_{5,4}\}$ VRS elements of a second block 604 are $\{v_{2,1}, v_{2,2}, v_{2,7}, v_{2,11}\}$ and are formed by taking a linear combination of the descrambled signal elements $\{y_{9,2}, y_{9,4}, y_{13,2}, y_{13,4}\}$. VRS elements of a third block 606 are $\{v_{30,1}, v_{30,2}, v_{30,7}, v_{30,11}\}$ and are formed by taking a linear combination of the descrambled signal elements $\{y_{233,2}, y_{233,4}, y_{237,2}, y_{237,4}\}$.

Figure 7:
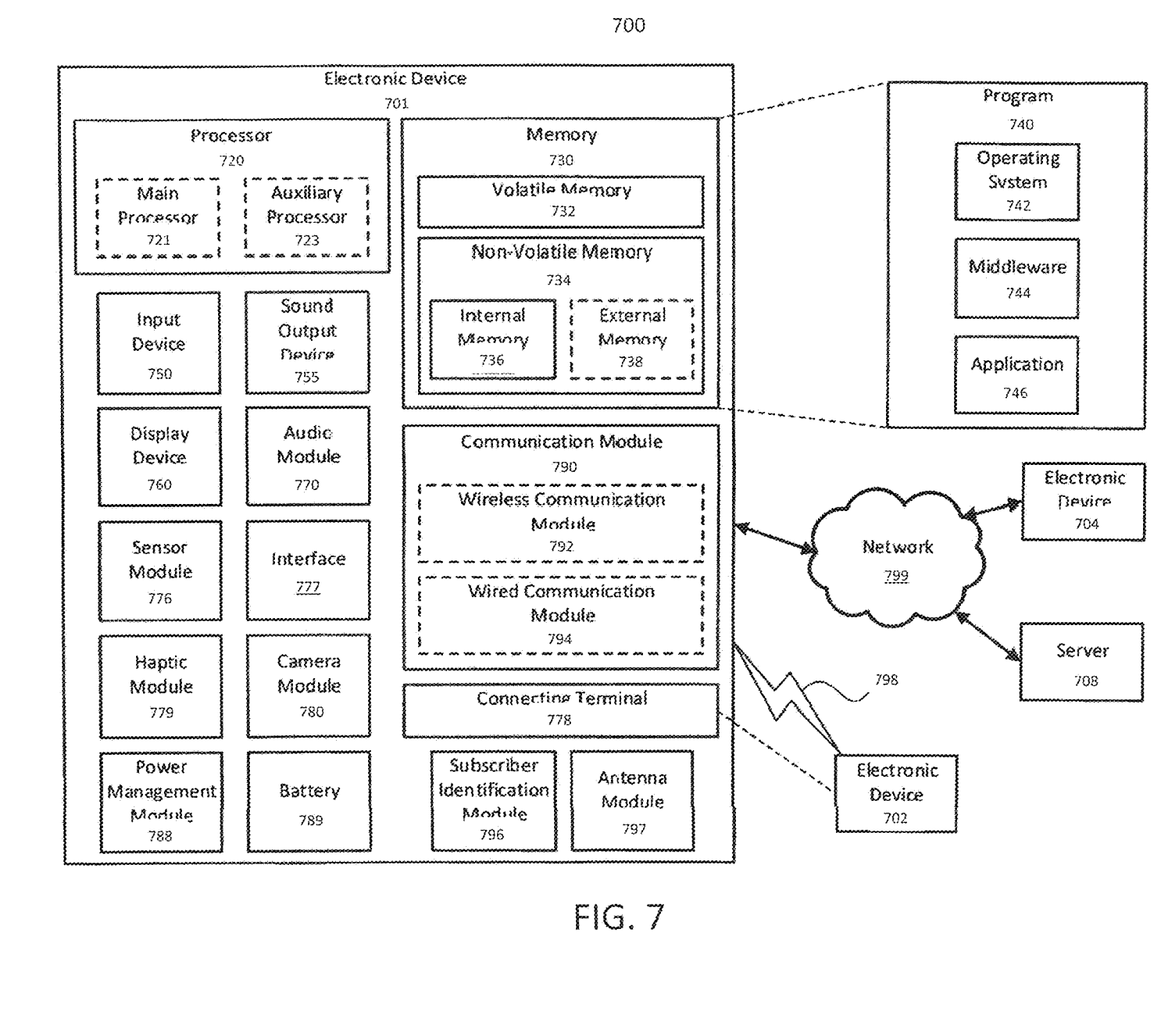
FIG. 7 is block diagram of an electronic device in a network environment, according to one embodiment.

FIG. 7 is a block diagram of an electronic device in a network environment, according to one embodiment. Referring to FIG. 7, an electronic device 701 in a network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In one embodiment, at least one (e.g., the display device 760 or the camera module 780) of the components may be omitted from the electronic device 701, or one or more other components may be added to the electronic device 701. Some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). The auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. The display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. The audio module 770 may obtain the sound via the input device 750, or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wired) or wirelessly. The interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. The connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. The haptic module 779 may include, for example, a motor, a piezoelectric element, or an electrical stimulator.

The camera module 780 may capture a still image or moving images. The camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. The battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. The communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. The antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

Commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of estimating reference signal received power (RSRP), the method comprising:
   receiving a signal in a modem;
   extracting signal elements at reference signal (RS) locations from the received signal, descrambling the signal elements at the RS locations;
   forming virtual reference signal (VRS) elements using the descrambled signal elements, wherein the VRS elements have smaller noise variances than original RS elements in corresponding locations of the received signal; and
   estimating the RSRP from the VRS elements.

2. The method of claim 1, wherein the signal elements are descrambled at the RS locations to remove an RS sequence.

3. The method of claim 1, wherein the VRS elements are used in place of the original RS elements to estimate the RSRP.

4. The method of claim 1, wherein forming the VRS elements comprises performing a linear average of the descrambled signal elements.

5. The method of claim 4, wherein, in performing the linear average, constraints are imposed on a weighting vector to reduce noise variance and maintain power of the descrambled signal elements.

6. The method of claim 5, wherein, in performing the linear average, the weighting vector is dynamically adjusted based on a channel type or a system parameter.

7. The method of claim 4, wherein, in performing the linear average, two descrambled signal elements are used for a given VRS element.

8. The method of claim 4, wherein, in performing the linear average, four descrambled signal elements are used for a given VRS element.

9. The method of claim 1, wherein estimating the RSRP comprises calculating at least one of a horizontal correlation and a vertical correlation from the VRS elements.

10. The method of claim 9, wherein the horizontal correlation and the vertical correlation are calculated, and estimating the RSRP comprises estimating one of a coherent RSRP and non-coherent RSRP from the horizontal correlation and the vertical correlation.

11. An electronic device, comprising:
    a processor; and
    a non-transitory computer readable storage medium storing instructions that, when executed, cause the processor to:
    receive a signal;
    extract signal elements at reference signal (RS) locations from the received signal;
    descramble the signal elements at the RS locations;
    form virtual reference signal (VRS) elements using the descrambled signal elements, wherein the VRS elements have smaller noise variances than original RS elements in corresponding locations of the received signal; and
    estimate the RSRP from the VRS elements.

12. The electronic device of claim 11, wherein the signal elements are descrambled at the RS locations to remove an RS sequence.

13. The electronic device of claim 11, wherein the VRS elements are used in place of the original RS elements to estimate the RSRP.

14. The electronic device of claim 11, wherein, in forming the VRS elements, a linear average of the descrambled signal elements is performed.

15. The electronic device of claim 14, wherein, in performing the linear average, constraints are imposed on a weighting vector to reduce noise variance and maintain power of the descrambled signal elements.

16. The electronic device of claim 15, wherein, in performing the linear average, the weighting vector is dynamically adjusted based on a channel type or a system parameter.

17. The electronic device of claim 14, wherein, in performing the linear average, two descrambled signal elements are used for a given VRS element.

18. The electronic device of claim 14, wherein, in performing the linear average, four descrambled signal elements are used for a given VRS element.

19. The electronic device of claim 11, wherein estimating the RSRP comprises calculating at least one of a horizontal correlation and a vertical correlation from the VRS elements.

20. The electronic device of claim 19, wherein the horizontal correlation and the vertical correlation are calculated, and estimating the RSRP comprises estimating one of a coherent RSRP and non-coherent RSRP from the horizontal correlation and the vertical correlation.

* * * * *